United States Patent
Nakamura et al.

(10) Patent No.: US 12,090,941 B2
(45) Date of Patent: Sep. 17, 2024

(54) CONTROL DEVICE, CONTROL METHOD, AND STORAGE MEDIUM

(71) Applicant: HONDA MOTOR CO., LTD., Tokyo (JP)

(72) Inventors: Hidetoshi Nakamura, Wako (JP); Kenji Komori, Wako (JP); Kenyu Okamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 17/696,915

(22) Filed: Mar. 17, 2022

(65) Prior Publication Data

US 2022/0306030 A1 Sep. 29, 2022

(30) Foreign Application Priority Data

Mar. 26, 2021 (JP) ................... 2021-052737

(51) Int. Cl.
  *B60R 21/01* (2006.01)
  *B60R 21/0134* (2006.01)
  *B60R 21/36* (2011.01)

(52) U.S. Cl.
  CPC .......... *B60R 21/0134* (2013.01); *B60R 21/36* (2013.01); *B60R 2021/01231* (2013.01)

(58) Field of Classification Search
  CPC ............... B60R 21/0134; B60R 21/36; B60R 2021/01231; B60R 21/01; B60W 30/085
  See application file for complete search history.

(56) References Cited

U.S. PATENT DOCUMENTS

| 2004/0169362 A1* | 9/2004 | Hammer ................ B60R 21/36 280/751 |
| 2006/0213714 A1 | 9/2006 | Igawa |
| 2010/0138115 A1* | 6/2010 | Kageyama .......... B60R 21/0134 701/45 |
| 2016/0257281 A1* | 9/2016 | Jenny .................... B60R 21/36 |

(Continued)

FOREIGN PATENT DOCUMENTS

| CN | 105939906 | 9/2016 |
| CN | 110816464 | 2/2020 |

(Continued)

OTHER PUBLICATIONS

Chinese Office Action for Chinese Patent Application No. 202210249348.9 dated Feb. 28, 2024.

(Continued)

*Primary Examiner* — Joseph J Dallo
(74) *Attorney, Agent, or Firm* — Amin, Turocy & Watson, LLP

(57) ABSTRACT

A control device of an embodiment includes an airbag inflated at least onto a hood of a vehicle by being filled with gas supplied from a gas supply, a recognizer that recognizes a surroundings situation of the vehicle, an index value deriver that derives an index value indicating a degree of overlap in a vehicle width direction between a traffic participant recognized by the recognizer and the vehicle when the traffic participant comes into contact with the vehicle, and an airbag controller that controls a timing at which the airbag is inflated, on the basis of the index value derived by the index value deriver.

8 Claims, 8 Drawing Sheets

(56) References Cited

U.S. PATENT DOCUMENTS

| | | | |
|---|---|---|---|
| 2016/0375899 A1 * | 12/2016 | Takenaka | B60R 21/0132 |
| | | | 701/41 |
| 2018/0194315 A1 | 7/2018 | Wakabayashi et al. | |
| 2019/0084522 A1 * | 3/2019 | Funahashi | B60R 21/0136 |
| 2019/0366971 A1 | 12/2019 | Nakamura et al. | |
| 2019/0375366 A1 | 12/2019 | Kanno et al. | |
| 2020/0047708 A1 | 2/2020 | Umezawa et al. | |

FOREIGN PATENT DOCUMENTS

| | | | |
|---|---|---|---|
| JP | 08-258668 | | 10/1996 |
| JP | 2004-535967 | | 12/2004 |
| JP | 2006137300 A | * | 6/2006 |
| JP | 2006-264416 | | 10/2006 |
| JP | 2019-209824 | | 12/2019 |
| JP | 2019-209923 | | 12/2019 |
| JP | 2020-147088 | | 9/2020 |
| WO | 02/055337 | | 7/2002 |
| WO | 2017/006532 | | 1/2017 |
| WO | WO-2017169797 A1 * | 10/2017 | ......... B60R 21/0134 |

OTHER PUBLICATIONS

Japanese Office Action for Japanese Patent Application No. 2021-052737 dated Apr. 16, 2024.

* cited by examiner

CONTROL DEVICE, CONTROL METHOD, AND STORAGE MEDIUM

CROSS-REFERENCE TO RELATED APPLICATION

Priority is claimed on Japanese Patent Application No. 2021-052737, filed Mar. 26, 2021, the content of which is incorporated herein by reference.

BACKGROUND

Field of the Invention

The present invention relates to a control device, a control method, and a storage medium.

Description of Related Art

Conventionally, a multi-chamber type of bumper airbag device that opens from a bumper of a vehicle when contact with another vehicle is detected is known (for example, Published Japanese Translation No. 2004-535967).

SUMMARY

However, in the related art, appropriately controlling an inflation timing of an airbag or the like on the basis of a contact situation between a vehicle and a traffic participant such as a pedestrian when the traffic participant comes into contact with the vehicle is not considered. Therefore, it is not possible to reduce a load on the traffic participant who comes into contact with the vehicle in some cases.

Aspects of the present invention have been made in consideration of such circumstances, and an object of the present invention is to provide a control device, a control method, and a storage medium capable of further reducing a load on a traffic participant who comes into contact with a vehicle.

The control device, control method, and storage medium according to the present invention have the following configurations.

(1): A control device according to an aspect of the present invention is a control device including an airbag inflated at least onto a hood of a vehicle by being filled with gas supplied from a gas supply; a recognizer configured to recognize a surroundings situation of the vehicle; an index value deriver configured to derive an index value indicating a degree of overlap in a vehicle width direction between a traffic participant recognized by the recognizer and the vehicle when the traffic participant comes into contact with the vehicle; and an airbag controller configured to control a timing at which the airbag is inflated, on the basis of the index value derived by the index value deriver.

(2): In the aspect (1), when the index value is smaller than a threshold value, the airbag controller delays the timing at which the airbag is inflated compared with a case in which the index value is equal to or larger than the threshold value.

(3): In the aspect (1), the airbag includes a first chamber inflated to cover a front head of a vehicle body and a second chamber inflated onto a hood of the vehicle by being filled with the gas supplied from the gas supply, and when the index value is smaller than the threshold value, the airbag controller delays a timing at which the second chamber is inflated from a timing at which the first chamber is inflated.

(4): In the aspect (1), the control device further includes: a driving controller configured to control one or both of steering and acceleration or deceleration of the vehicle without depending on an operation of an occupant of the vehicle, wherein the driving controller controls at least the steering of the vehicle when the index value is smaller than the threshold value.

(5): In the aspect (4), the driving controller controls the steering of the vehicle so that a position in which the vehicle comes into contact with the traffic participant is closer to a center of the vehicle.

(6): A control method according to another aspect of the present invention is a control method including: recognizing, by a computer of a control device, a surroundings situation of a vehicle; deriving, by the computer, an index value indicating a degree of overlap in a vehicle width direction between a recognized traffic participant near the vehicle and the vehicle when the traffic participant comes into contact with the vehicle; and controlling, by the computer, a timing at which an airbag is inflated, on the basis of the derived index value, the airbag being inflated at least onto a hood of the vehicle by being filled with gas supplied from a gas supply.

(7): A storage medium according to still another aspect of the present invention is a computer-readable non-transitory storage medium having a program stored therein, the program causing a computer of a control device, to: recognize a surroundings situation of a vehicle; derive an index value indicating a degree of overlap in a vehicle width direction between a recognized traffic participant near the vehicle and the vehicle when the traffic participant comes into contact with the vehicle; and control a timing at which an airbag is inflated, on the basis of the derived index value, the airbag being inflated at least onto a hood of the vehicle by being filled with gas supplied from a gas supply.

According to the aspects (1) to (7), it is possible to further reduce a load on the traffic participant who comes into contact with the vehicle.

DESCRIPTION OF EMBODIMENTS

Hereinafter, embodiments of the control device, control method, and storage medium of the present invention will be described with reference to the drawings. Hereinafter, a vehicle system including the control device will be described. A vehicle on which the vehicle system is mounted is, for example, a vehicle such as a four-wheeled vehicle, a three-wheeled vehicle, or a two-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell. In the following description, front-rear, left-right, and up-down directions correspond to front-rear, left-right, and up-down directions of a vehicle, and a left-right direction may be referred to as a vehicle width direction or a lateral direction.

Figure 1:
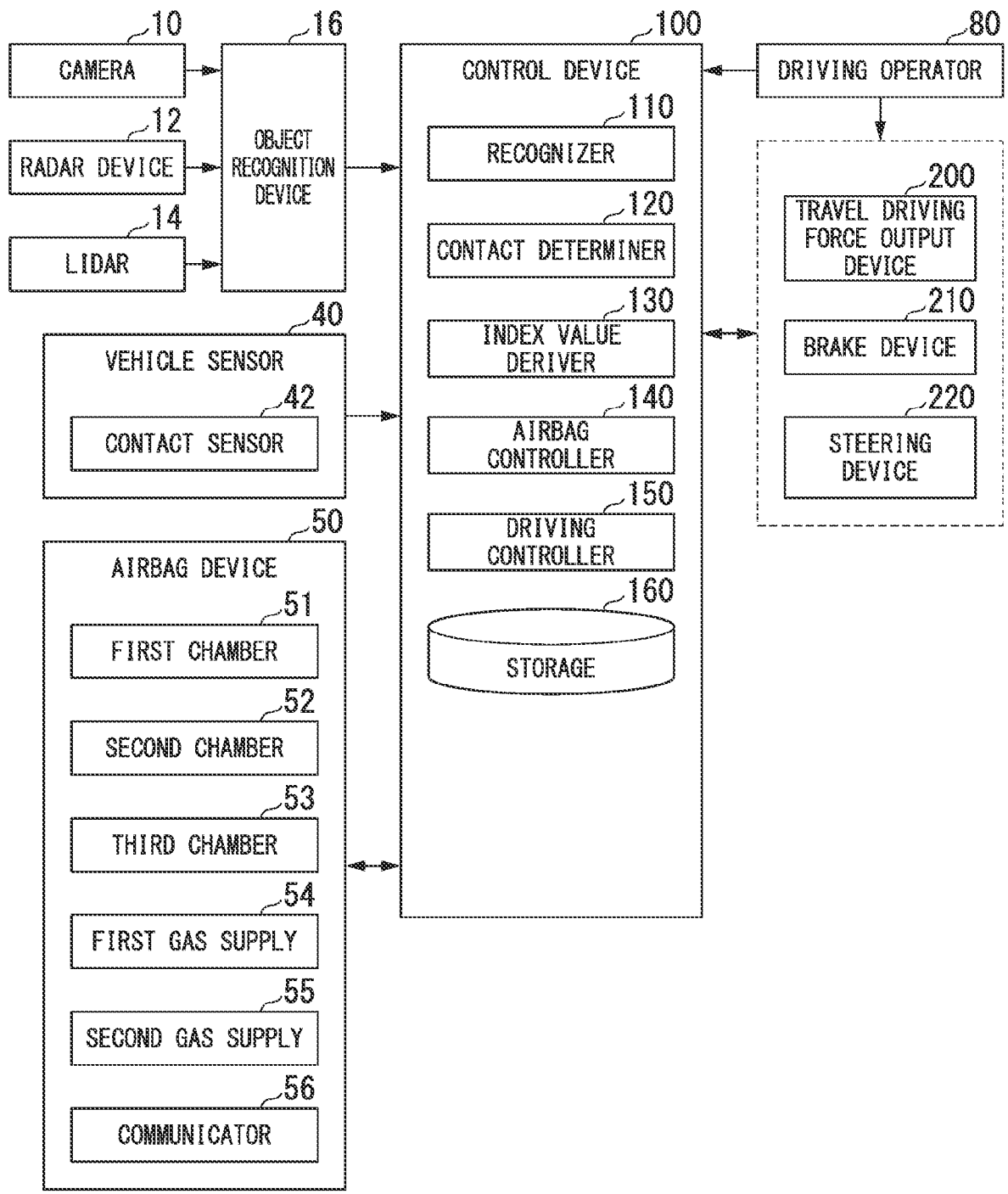
FIG. 1 is a diagram illustrating an example of a vehicle system including a control device according to an embodiment.

FIG. 1 is a diagram illustrating an example of a vehicle system 1 including a control device 100 according to an embodiment. The vehicle system 1 includes, for example, a camera 10, a radar device 12, a light detection and ranging (LIDAR) 14, an object recognition device 16, a vehicle sensor 40, an airbag device 50, a driving operator 80, a control device 100, a travel driving force output device 200, a brake device 210, and a steering device 220.

The camera 10 is, for example, a digital camera using a solid-state imaging device such as a charge coupled device (CCD) or a complementary metal oxide semiconductor (CMOS). The camera 10 is attached to any location on a vehicle (hereinafter, a vehicle M) in which the vehicle system 1 is mounted. When the camera 10 images a side in front of the vehicle M, the camera 10 is attached to, for example, an upper portion of a front windshield, a rear surface of a rearview mirror, a front head of the vehicle body, and the like. When the camera 10 images a side behind the vehicle M, the camera 10 may be attached to an upper portion of a rear windshield, a back door, or the like or may be attached to a door mirror or the like. The camera 10, for example, images surroundings of the vehicle M periodically and repeatedly. The camera 10 may be a stereo camera.

The radar device 12 radiates radio waves such as millimeter waves to the surroundings of the vehicle M and detects radio waves (reflected waves) reflected by a surrounding object to detect at least a position (a distance and orientation) of the object. The radar device 12 is attached to any location on the vehicle M. The radar device 12 may detect a position and a speed of the object using a frequency modulated continuous wave (FM-CW) scheme.

The LIDAR 14 irradiates the surroundings of the vehicle M with light and measures scattered light. The LIDAR 14 detects a distance to a target on the basis of a time from light emission to light reception. The light to be radiated is, for example, pulsed laser light. The LIDAR 14 is attached to any location on the vehicle M.

The object recognition device 16 performs sensor fusion processing on detection results of some or all of the camera 10, the radar device 12, and the LIDAR 14 to recognize a position, type, speed, and the like of an object existing near the vehicle M. The object includes, for example, a traffic participant, a surrounding vehicle, or a road structure. The traffic participant may include, for example, at least a pedestrian, and may include a person riding a bicycle, a wheelchair, or a motorcycle. Hereinafter, it is assumed that the traffic participant is the pedestrian. The road structure includes, for example, a road sign, a traffic light, a railroad crossing, curb, median, guardrail, or a fence. The road structure may include, for example, a road sign such as a road lane marking, a pedestrian crossing, a bicycle crossing, or a stop line drawn or affixed to a road surface. The object may include an obstacle such as a falling object on a road (for example, a load of another vehicle or a signboard installed around the road). The object recognition device 16 outputs recognition results to the control device 100. The object recognition device 16 may output detection results of the camera 10, the radar device 12, and the LIDAR 14 as they are to the control device 100. In this case, the control device 100 may have the function of the object recognition device 16.

The vehicle sensor 40 includes, for example, a contact sensor 42. The contact sensor 42 is a sensor that detects contact between the vehicle M and an object. A plurality of contact sensors 42 are provided, for example, at any positions on the front, rear, or side of the vehicle body. The contact sensor 42 may detect a load on the vehicle body, and detect that the vehicle M has come into contact with an object when the detected load is equal to or greater than a predetermined value.

The vehicle sensor 40 includes, for example, a vehicle speed sensor that detects a speed of the vehicle M, an acceleration sensor that detects an acceleration, a yaw rate sensor that detects a yaw rate (for example, a rotation angle speed around a vertical axis passing through a point of a center of gravity of the vehicle M), and an orientation sensor that detects a direction of the vehicle M, in addition to the contact sensor 42. The vehicle sensor 40 may include a position sensor that acquires a position of the vehicle M. The position sensor is, for example, a sensor that acquires position information (longitude and latitude information) from a global positioning system (GPS) device. The position sensor may be, for example, a sensor that acquires the position information using a global navigation satellite system (GNSS) receiver. The vehicle sensor 40 outputs detection results of various sensors to the control device 100.

The airbag device 50 is an airbag device outside a vehicle that reduces a load on an object (for example, a pedestrian) that has come into contact with the vehicle M. Details of the airbag device 50 will be described below.

The driving operator 80 includes, for example, an accelerator pedal, a brake pedal, a shift lever, a steering wheel, a variant steering wheel, a joystick, and other operators. A sensor that detects an amount of operation or the presence or absence of the operation is attached to the driving operator 80, and a result of the detection is output to some or all of the travel driving force output device 200, the brake device 210, and the steering device 220.

The control device 100 includes, for example, a recognizer 110, a contact determiner 120, an index value deriver 130, an airbag controller 140, a driving controller 150, and a storage 160. The recognizer 110, the index value deriver 130, the airbag controller 140, and the driving controller 150 are realized, for example, by a hardware processor such as a central processing unit (CPU) executing a program (software). Some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as a hard disk drive (HDD) or a flash memory of the control device 100 in advance or may be stored in a detachable storage medium such as a DVD or a CD-ROM and installed in the HDD or flash memory of the control device 100 by the storage medium (a non-transitory storage medium) being mounted in a drive device.

The storage 160 may be realized by various storage devices described above, a solid state drive (SSD), an electrically erasable programmable read only memory (EEPROM), a read only memory (ROM), a random access memory (RAM), or the like. Information necessary for execution of various controls such as airbag control and driving control in the present embodiment, programs, and various types of other information, for example, are stored in the storage 160.

The recognizer 110 recognizes a surroundings situation of the vehicle M on the basis of information input from the camera 10, the radar device 12, and the LIDAR 14 via the object recognition device 16. The surroundings of the vehicle M are, for example, a range within a predetermined distance near the vehicle M. For example, the recognizer 110 recognizes a status such as a position, speed, acceleration, and moving direction of an object existing near the vehicle M. The surroundings of the vehicle M are a range within a predetermined distance near the vehicle M. The position of the object is recognized as, for example, a position on absolute coordinates with a representative point of the vehicle M (a center of gravity, a center of drive axis, or the like) as an origin, and is used for control. The position of the object may be represented by a representative point such as a center of gravity or a corner of the object or may be represented by a represented area. The "status" of the object may include an acceleration or jerk of the object, or an "action status" (for example, whether or not the object is changing lanes or is about to change lanes) when the object is a mobile object such as another vehicle.

The recognizer 110, for example, may recognize a type of the object (specifically, whether or not the object is a pedestrian) on the basis of feature information such as a shape, contour, size, and color of the object included in an image captured by the camera 10.

The contact determiner 120 determines whether or not the vehicle M comes into contact with the object on the basis of a recognition result of the recognizer 110. For example, the contact determiner 120 determines whether or not the vehicle M comes into contact with the object on the basis of a future travel prediction trajectory on the basis of the position and speed of the vehicle M and a future t prediction trajectory on the basis of the position and speed of the object. The contact determiner 120 may determine whether or not the vehicle M comes into contact with the object on the basis of a detection result of the contact sensor 42 or the like, or may determine whether or not the vehicle M has come into contact with the object on the basis of an amount of change in acceleration of the vehicle M detected by the acceleration sensor.

The index value deriver 130 an index value indicating a degree of overlap in the vehicle width direction between the pedestrian and the vehicle M when the contact determiner 120 determines that the vehicle M comes (or has come) into contact with the object and the object is the pedestrian.

The airbag controller 140 controls an operation of the airbag device 50 when the contact determiner 120 determines that the vehicle M comes into contact with the object. The airbag controller 140 controls the operation of the airbag device 50 on the basis of a contact position of the vehicle M acquired by the index value deriver 130 when the pedestrian comes into contact with the vehicle M.

The driving controller 150 executes driving control for controlling one or both of the steering and acceleration or deceleration of the vehicle M regardless of an operation of the occupant of the vehicle M. For example, the driving controller 150 executes driving control such as adaptive cruise control (ACC) or lane keeping assistance system (LKAS) as an advanced driver assistance system (ADAS) function on the basis of the recognition result of the recognizer 110.

For example, when it is determined that the vehicle M has come into contact with the pedestrian, the driving controller 150 controls at least the steering of the vehicle M between the steering or acceleration or deceleration of the vehicle M regardless of the operation of the occupant of the vehicle M, on the basis of the index value derived by the contact determiner 120 and the contact position acquired by the index value deriver 130. Details of functions of the contact determiner 120, the index value deriver 130, the airbag controller 140, and the driving controller 150 will be described below.

The travel driving force output device 200 outputs a travel driving force (torque) for traveling of the vehicle M to driving wheels. The travel driving force output device 200 includes, for example, a combination of an internal combustion engine, an electric motor, a transmission, and the like, and an electronic control unit (ECU) that controls these. The ECU controls the above configuration according to information input from the driving controller 150 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the driving controller 150 or the information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder, as a backup. The brake device 210 is not limited to the configuration described above and may be an electronically controlled hydraulic brake device that controls an actuator according to the information input from the driving controller 150 and transfers the hydraulic pressure of the master cylinder to the cylinder.

The steering device 220 includes, for example, a steering ECU and an electric motor. The electric motor, for example, changes directions of steerable wheels by causing a force to act on a rack and pinion mechanism. The steering ECU drives the electric motor according to the information input from the driving controller 150 or the information input from the steering wheel 82 of the driving operator 80 to change the directions of the steerable wheels.

[Structure of Airbag Device]

Figure 2:
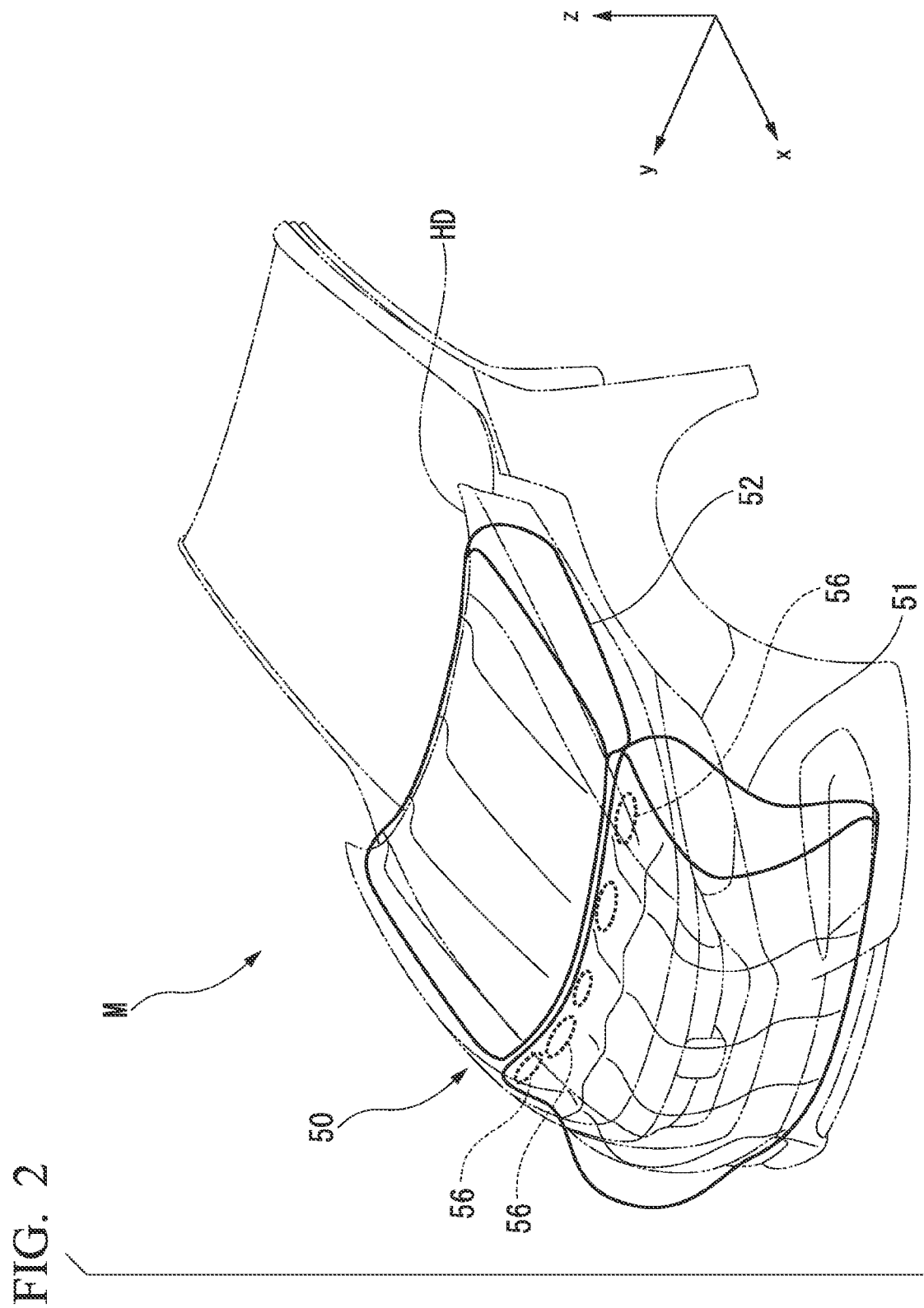
FIG. 2 is an external perspective view of an airbag device according to the embodiment.
Figure 3:
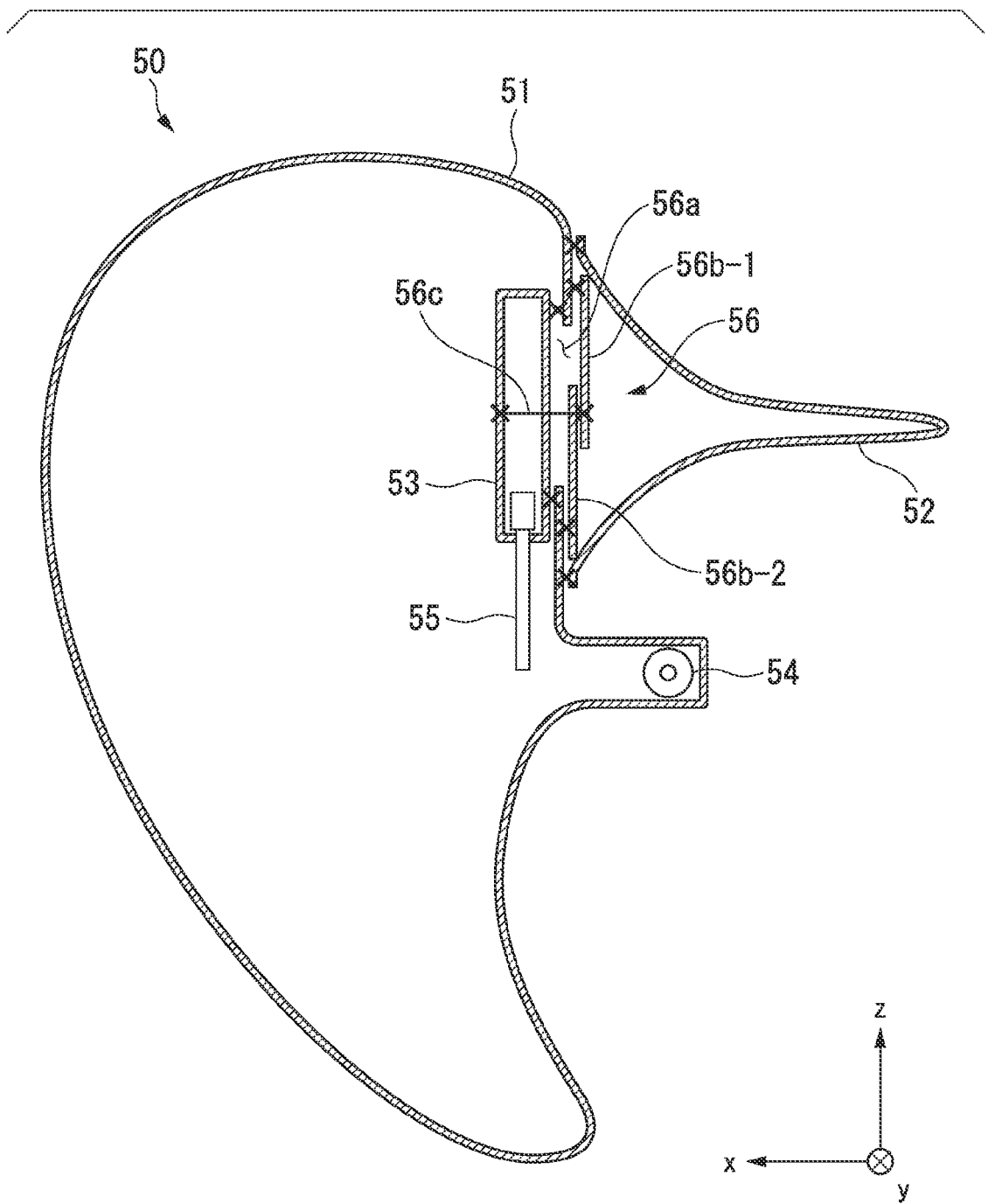
FIG. 3 is a schematic cross-sectional view illustrating an inflated state of a first chamber according to the embodiment.
Figure 4:
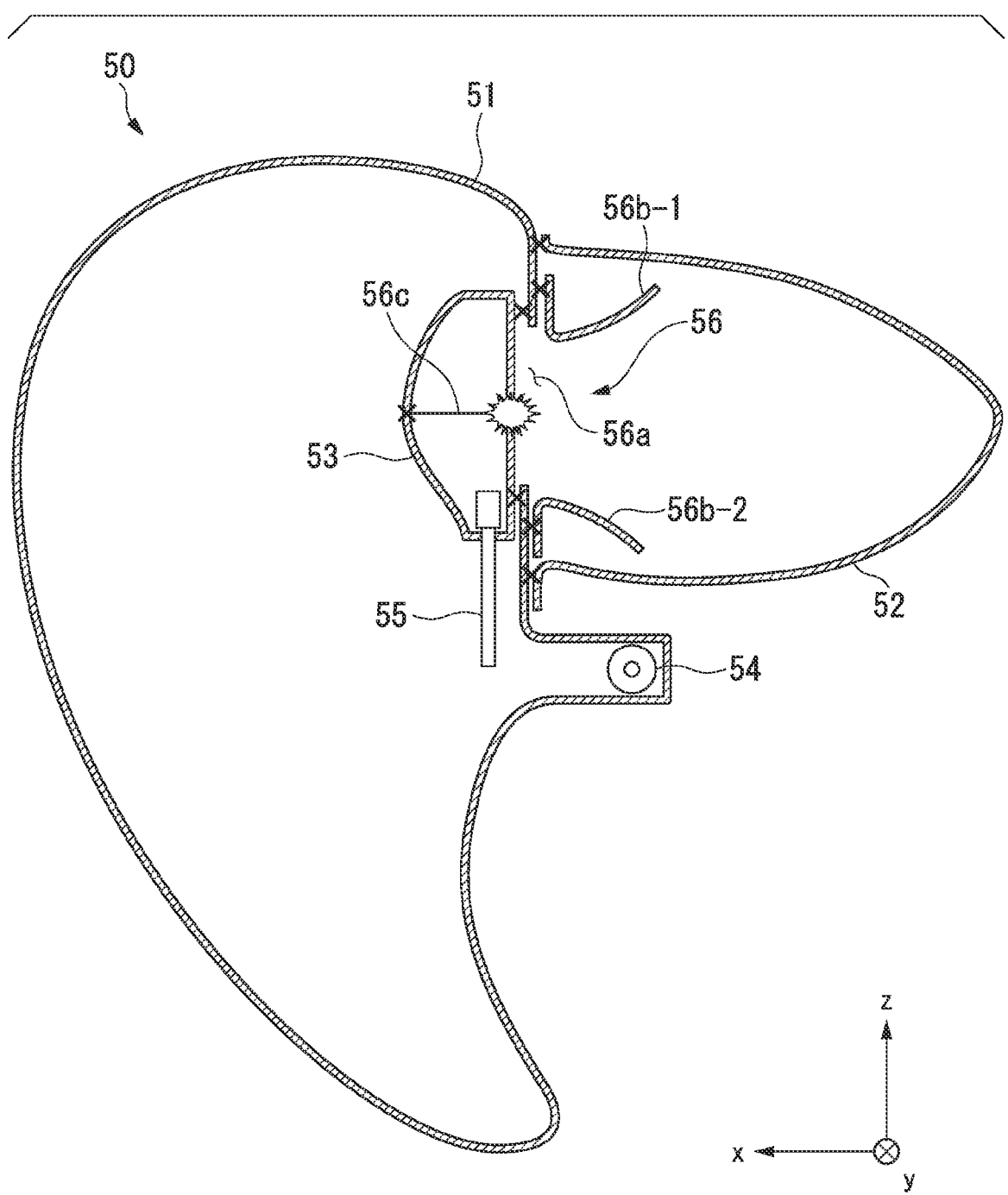
FIG. 4 is a schematic cross-sectional view illustrating an inflated state of a second chamber and a third chamber according to the embodiment.

Next, a structure of the airbag device 50 according to the embodiment will be described. Hereinafter, a case in which an airbag is an airbag device outside a vehicle that is inflated and opens on a front portion of the vehicle body will be described. FIG. 2 is an external perspective view of the airbag device 50 according to the embodiment. FIG. 3 is a schematic cross-sectional view illustrating an inflated state of a first chamber 51 according to the embodiment. FIG. 4 is a schematic cross-sectional view illustrating an inflated state of a second chamber 52 and a third chamber 53 according to the embodiment. FIGS. 3 and 4 are schematic cross-sectional views in an xy plane. "X" illustrated in FIGS. 3 and 4 indicates a coupling portion.

In FIGS. 2 to 4, the airbag device 50 includes, for example, the first chamber 51 that is inflated to cover the front head of the vehicle body, the second chamber 52 that is inflated to cover an upper side of a hood (bonnet hood) HD of the vehicle body, and the third chamber 53. The first chamber 51, the second chamber 52, and the third chamber 53 are examples of the "airbag." The airbag device 50 includes a first gas supply 54, a second gas supply 55, and a communicator 56. The airbag device 50 causes the first gas supply 54 and the second gas supply 55 to supply gas to each chamber. Each chamber is inflated and opens in a predetermined shape at a predetermined position due to filling with gas to be supplied. Hereinafter, the chamber opening in the predetermined shape due to the inflation may be referred to as "inflation opening." The airbag device 50 is housed inside the hood HD, for example, inside an engine room.

The first chamber 51 is housed inside the hood HD of the vehicle M in a folded state before inflation. The first chamber 51 is formed in a bag shape by sewing a base cloth, for example. The first chamber 51 is connected to the first gas supply 54 that generates high-pressure gas. For the first gas supply 54, for example, an inflator can be used. The first chamber 51 is inflated toward the front side (in an x-axis direction in the figure) of the vehicle M from, for example, a gap between the hood HD in which the first chamber 51 is housed and the bumper and opens in a predetermined shape by being filled with the gas from the first gas supply 54.

The second chamber 52 is housed inside the hood HD in a folded state before inflation, similar to the first chamber 51. The second chamber 52 is formed in a bag shape by sewing the same base cloth as the first chamber 51. The second chamber 52 is connected to the first chamber 51 and integrally formed with the first chamber 51. The second chamber 52 communicates with the inside of the first chamber 51 through the communicator 56. Therefore, the second chamber 52 is inflated toward the upper side of the hood HD (in a z-axis direction in the figure) from the gap between the hood HD and the bumper by the gas flowing from the first chamber 51 through the communicator 56. A plurality of communicators 56 are provided, for example, at intervals in the vehicle width direction (a y-axis direction in the figure).

The third chamber 53 is provided between, for example, the first chamber 51 and the second chamber 52. For example, the third chamber 53 is housed in the first chamber 51 and is disposed to cover the communicator 56. The third chamber 53 is formed in a bag shape by sewing the same base cloth as the first chamber 51. The third chamber 53 is inflated with the gas supplied from the second gas supply 55 and opens. The second gas supply 55 is, for example, a micro gas generator (MGG). The third chamber 53 may be tacked to a lid 56b (see FIG. 3). The third chamber 53 may be attached to a metal component such as a retainer or may be internally sewn to the first chamber 51.

The third chamber 53 is inflated toward the front side of the vehicle body inside the first chamber 51. The third chamber 53 is not inflated to the side opposite to a front direction of the vehicle body (the communicator 56 side). A volume at the time of the inflation of the third chamber 53 is smaller than a volume at the time of the inflation of the first chamber 51.

The first gas supply 54 and the second gas supply 55 supply gas to the chamber at a predetermined timing under the control of the airbag controller 140. In the first gas supply 54 and the second gas supply 55, an amount of gas to be supplied may be adjusted under the control of the airbag controller 140.

The communicator 56 includes, for example, an opening 56a, a lid 56b, and a coupling member 56c. The communicator 56 is configured to allow communication between the inside of the first chamber 51 and the inside of the second chamber 52. In the examples of FIGS. 3 and 4, the opening 56a is provided on the first chamber 51 side and communicates the inside of the first chamber 51 and the inside of the second chamber 52. The second chamber 52 is connected to the first chamber 51 to surround the entire opening 56a. The opening 56a may be provided on the second chamber 52 side, and in this case, the first chamber 51 is connected to the second chamber 52 to surround the entire opening 56a.

The lid 56b covers the entire opening 56a, and the lid 56b is opened or closed to cause gas from the first chamber 51 to flow into the second chamber 52 or curb the inflow of the gas. The lid 56b includes, for example, a first lid 56b-1 and a second lid 56b-2, as illustrated in FIGS. 3 and 4. For example, in a state before the third chamber 53 is inflated (a state illustrated in FIG. 3), the first lid 56b-1 and the second lid 56b-2 enter a closed state in which the entire opening 56a is covered, and curb the inflow of gas from the first chamber 51 to the second chamber 52. When the third chamber 53 is in an inflated state (a state illustrated in FIG. 4), the first lid 56b-1 and the second lid 56b-2 enter an open state in which the opening 56a is open. In this state, the gas in the first chamber 51 flows into the second chamber 52 from the opening 56a.

One end of the coupling member 56c is connected to the third chamber 53 and the other end thereof is connected to the lid 56b in a state before the third chamber 53 is inflated, so that the third chamber 53 is coupled to the lid 56b. The coupling member 56c is connected to a portion in which the first lid 56b-1 overlaps the second lid 56b-2. When the third chamber 53 is inflated as illustrated in FIG. 4, a connecting portion between the coupling member 56c and the third chamber 53 is pulled and cut. The coupling member 56c may be cut when an electric cutter provided in advance is operated at the time of inflation of the third chamber 53. When the coupling member 56c is cut, the first lid 56b-1 and the second lid 56b-2 enter an open state.

With the structure of the airbag device 50 described above, it is possible to inflate and open the first chamber 51 and the second chamber 52 simultaneously (including an error range), or delay the second chamber 52 from an inflation timing of the first chamber 51.

The airbag device 50 may include a pop-up hood system (hereinafter referred to as a PUH system), in addition to the above-described configuration. The PUH system includes a mechanism that lifts the hood HD upward when the vehicle M comes into contact with an object (for example, a pedestrian). Accordingly, it is possible to provide a space with respect to, for example, an engine mounted on the vehicle M and reduce a load (impact or the like) that is applied to, for example, a head portion of the pedestrian. The PUH system is operated, for example, under the control of the airbag controller 140.

[Contact Determiner 120 and Index Value Deriver 130]

Figure 5:
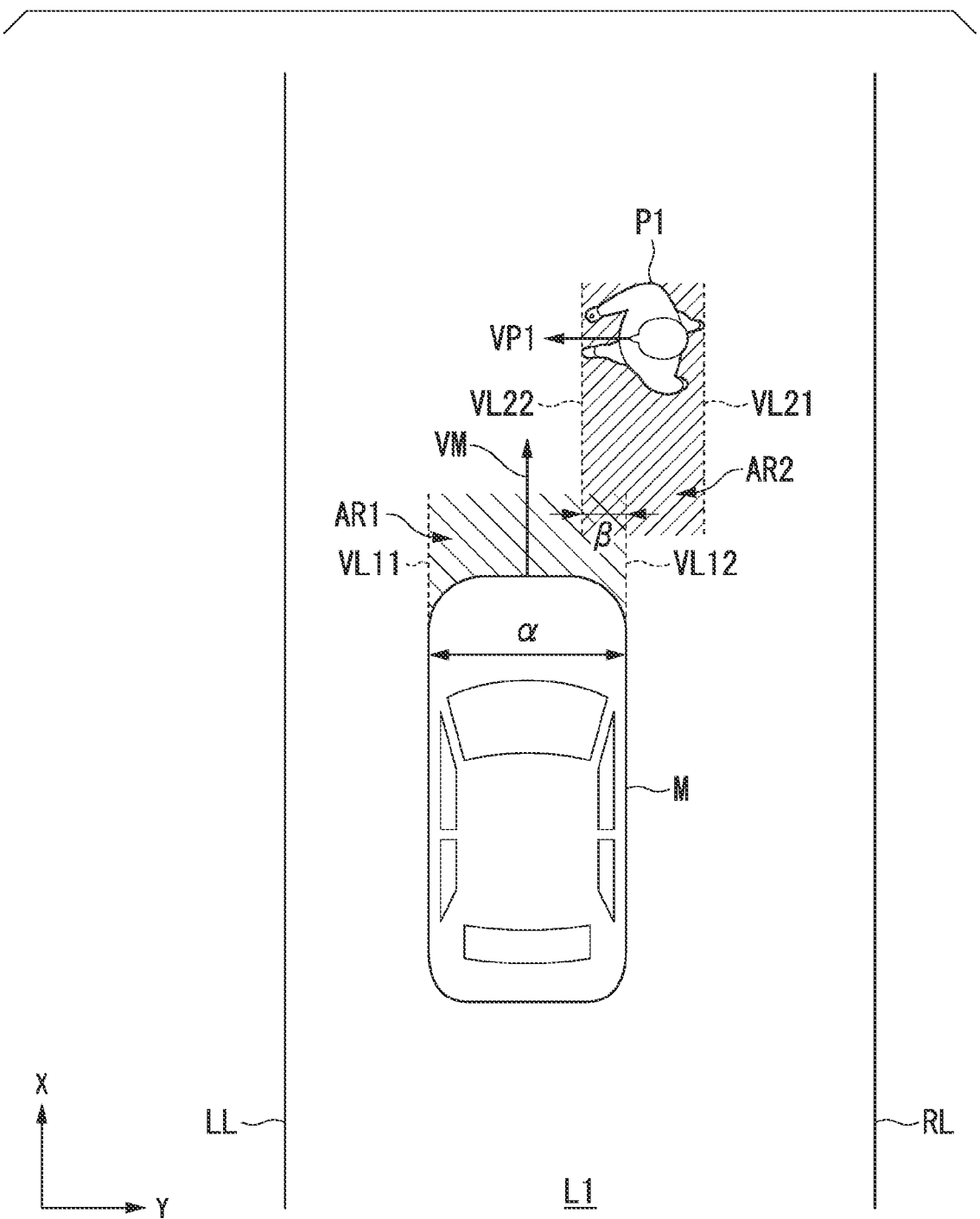
FIG. 5 is a diagram illustrating a contact determiner and an index value deriver.

Next, details of functions of the contact determiner 120 and the index value deriver 130 will be described. Hereinafter, a case in which an object in a traveling direction of the vehicle M is a pedestrian will be described. FIG. 5 is a diagram illustrating the contact determiner 120 and the index value deriver 130. In the example of FIG. 5, it is assumed that the vehicle M is traveling in the traveling direction at a speed VM in a lane L1 extending in an X-axis direction in FIG. 5. It is assumed that the pedestrian P1 is present in the traveling direction of the vehicle M. It is assumed that the pedestrian P1 is walking (walking across the lane L1) at a speed VP1 from a road lane marking RL to a road lane marking LL (a road width direction or a —Y-axis direction). FIG. 5 is, for example, a diagram (a top view image diagram) illustrating a three-dimensional image captured by the camera 10, which is converted into XY plane coordinates.

For example, the contact determiner 120 sets the future travel prediction trajectory of the vehicle M in a case in which the speed VM and a steering angle of the vehicle M are assumed to be constant on the basis of the position and the speed VM of the vehicle M in a time series. In the example of FIG. 5, an area AR1 sandwiched between two virtual lines VL11 and VL12 extending in a central axis direction of the vehicle M from left and right ends of the vehicle M and in front of the vehicle M is set as the travel prediction trajectory. A distance between the left and right ends of the vehicle M corresponds to, for example, a vehicle width α. The travel prediction trajectory may be set with a bend in consideration of, for example, the steering angle. The contact determiner 120 derives the future prediction trajectory of the pedestrian P1 in a case in which the speed VP1 and the moving direction are assumed to be constant, on the basis of the position and the speed VP1 of the pedestrian P1 in a time series. The contact determiner 120 determines that the vehicle M comes in contact with the pedestrian P1 when the position of the pedestrian P1 is within the area AR1 at a time when the vehicle M is predicted to reach a position of the pedestrian P1 (a position on the X-axis), and determines that the vehicle M does not come into contact with the pedestrian P1 when the position of the pedestrian P1 is not within the area AR1.

The contact determiner 120 may determine that the vehicle M has come into contact with the pedestrian P1 when a load of a predetermined value or more is detected by the contact sensor 42, and may determine that the vehicle M has come into contact with the pedestrian P1 when an amount of deceleration equal to or larger than a predetermined amount is detected by the acceleration sensor.

The index value deriver 130 derives the index value indicating the degree of overlap in the vehicle width direction between the pedestrian P1 and the vehicle M when the contact determiner 120 determines that the vehicle M comes (has come) into contact with the pedestrian P1. The index value is, for example, a lap amount or a lap rate. For example, the index value deriver 130 sets an area AR2 sandwiched between virtual lines VL21 and VL22 extending in a vehicle direction (a direction perpendicular to the vehicle width direction) from the left and right ends (horizontal width) of an area of the pedestrian P1 at a time when the vehicle M is predicted to reach the position of the pedestrian P1. The contact determiner 120 derives the amount of overlap in the vehicle width direction between the area AR1 and the area AR2 (a distance in the vehicle width direction between the virtual lines VL12 and VL22 in the example of FIG. 5) as a lap amount β. The index value deriver 130 derives a value ((β/α)×100) obtained by multiplying a value obtained by dividing the lap amount β by the vehicle width α by 100 as a lap rate [%].

The index value deriver 130 may estimate the position of the vehicle M that comes in contact with the pedestrian P1 on the basis of the lap amount or the lap rate. For example, the index value deriver 130 estimates that the pedestrian P1 comes into contact with a side portion of the vehicle M when the lap amount is smaller than a first threshold value, and estimates that the pedestrian P1 comes into contact with a center of the vehicle M when the lap amount is equal to or larger than the first threshold value. The index value deriver 130 estimates that the pedestrian P1 comes into contact with the side portion of the vehicle M when the lap rate is smaller than a second threshold value, and estimates that the pedestrian P1 comes into contact with the center of the vehicle M when the lap rate is equal to or larger than the second threshold value. The index value deriver 130 may detect the position of the vehicle M that has come into contact with the pedestrian P1 on the basis of installation positions of a plurality of contact sensors 42 and a load distribution of each contact sensor 42.

[Airbag controller]

Next, details of a function of the airbag controller 140 will be described. The airbag controller 140 operates the airbag device 50 when the contact determiner 120 determines that the vehicle M comes into contact with the object. In this case, the airbag controller 140 derives, for example, a time (TTC; Time-To-Collision) when it is predicted that the vehicle M comes into contact with the object, and operates the airbag device 50 when the derived time is smaller than a predetermined time. The TTC is, for example, a value obtained by dividing a distance between the vehicle M and the object by a relative speed (which is limited to an approaching side). In the example of FIG. 5, the airbag controller 140 derives the TTC by dividing a distance between the vehicle M and the pedestrian P1 by a relative speed (VM) on the side on which both approach each other. The airbag controller 140 may adjust the amount of gas to be supplied from the first gas supply 54 and the second gas supply 55 on the basis of a type or size of the object that comes into contact with the vehicle M, a speed of the vehicle M or the object, or the like, for example.

In a case in which the airbag controller 140 operates the airbag device 50, the airbag controller 140 controls a timing at which the airbag (the first chamber 51, the second chamber 52, and the third chamber 53) is inflated (hereinafter referred to as an inflation timing) on the basis of an index value such as the lap amount or the lap rate when it is determined that the vehicle M comes into contact with the object and the object is a pedestrian. For example, when the index value is smaller than a threshold value, the airbag controller 140 delays at least an inflation timing of the second chamber 52 that is inflated and opens onto the hood HD, as compared with a case in which the index value is equal to or larger than the threshold value. When the index value is smaller than the threshold value, the airbag controller 140 delays at least the inflation timing of the second chamber 52 that is inflated and opens onto the hood HD, from an inflation timing of the first chamber.

The airbag controller 140 inflates the first chamber 51 and the second chamber 52 at the same timing in a case other than the above conditions. The case other than the above conditions is, for example, a case in which an object determined to come into contact with the vehicle M is not a pedestrian (including a traffic participant), or a case in which the object is a pedestrian, but the index value is equal to or larger than the threshold value.

[Operation of Airbag Device 50 when Inflation Timing of Second Chamber 52 is Delayed]

An operation of the airbag device 50 when the inflation timing of the second chamber 52 is delayed will be described. First, the airbag controller 140 causes gas to be supplied from the first gas supply 54 to the first chamber 51. Accordingly, the first chamber 51 is inflated toward the front side of the vehicle M, as illustrated in FIG. 3. In this case, since a closed state of the lid 56b is held by the coupling member 56c, the inflation of the second chamber 52 is curbed.

After the first chamber 51 is inflated, the third chamber 53 is filled with gas from the second gas supply 55. When the third chamber 53 is inflated, the coupling member 56c that connects the third chamber 53 to the lid 56b is pulled and cut at a point in time when a predetermined tension is reached.

When the coupling member 56c is cut, the lid 56b enters an open state. Accordingly, the gas filled in the first chamber 51 flows into the second chamber 52 through the opening 56a of the communicator 56. The second chamber 52 is inflated, as illustrated in FIG. 4. Thus, the second chamber 52 is inflated and opens with a delay from the first chamber 51 (in order with a predetermined time difference).

The airbag controller 140 may control the amount of gas supplied from the first gas supply 54 to delay the inflation timing of the second chamber 52, instead of (or in addition) the control of the inflation timing by the communicator 56 described above. It is possible to adjust a delay time by controlling the amount of gas to be supplied.

[Operation of Airbag Device 50 when First Chamber 51 and Second Chamber 52 are Inflated Simultaneously]

Next, an operation of the airbag device 50 when the first chamber 51 and the second chamber 52 are inflated simultaneously will be described. The airbag controller 140 causes gas to be supplied from the first gas supply 54 to the first chamber 51, and causes gas to be supplied from the second gas supply 55 to the third chamber 53. Accordingly, the first chamber 51 is inflated toward the front side of the vehicle M, and the third chamber 53 also starts inflation at the same timing as the start of the inflation of the first chamber 51. When the third chamber 53 is inflated and opens, the coupling member 56c is cut and the lid 56b enters an open state. Accordingly, the gas filled in the first chamber 51 flows into the second chamber 52 through the opening 56a of the communicator 56. Accordingly, the first chamber 51 and the second chamber 52 are inflated and open (at the same timing) without any time difference.

Figure 6:
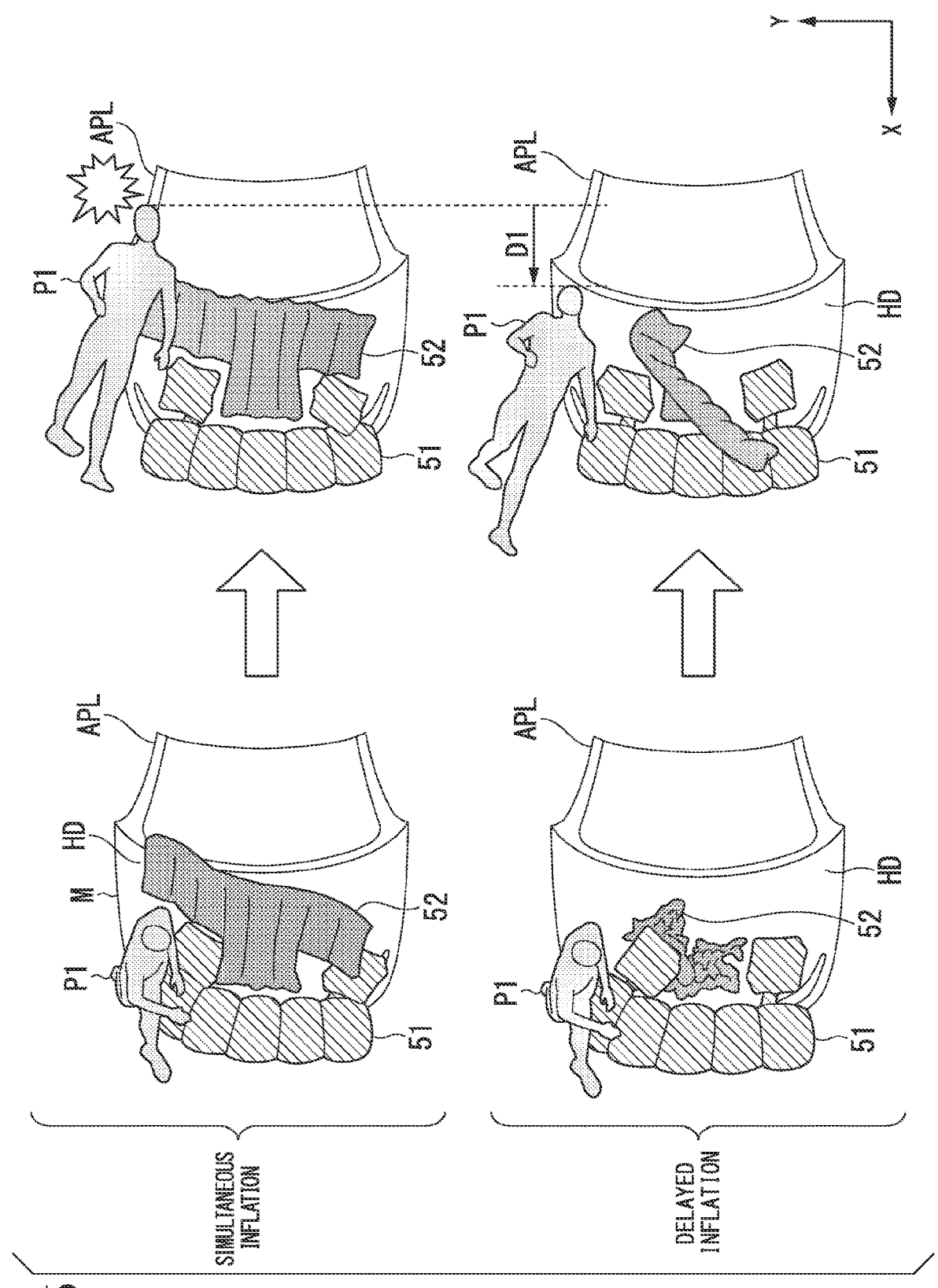
FIG. 6 is a diagram illustrating a difference between positions of a traffic participant according to an inflation timing of an airbag.

It is possible to bring the pedestrian P1 into contact with the vehicle M at a safer position by performing inflation control of the airbag described above. FIG. 6 is a diagram illustrating a difference between positions of the pedestrian P1 according to an inflation timing of an airbag. In an example of FIG. 6, the first chamber 51 that is inflated and opens in front of the vehicle body of the vehicle M and the second chamber 52 inflated and opening onto the hood HD are schematically shown. In the example of FIG. 6, when the pedestrian P1 has come into contact with a front side portion of the vehicle M (when the lap amount (or lap rate) between the vehicle M and the pedestrian P1 is smaller than a threshold value), positions of the pedestrian P1 after contact in a case in which the first chamber 51 and the second chamber 52 are inflated simultaneously (simultaneous inflation in FIG. 6) and a case in which at least the inflation timing of the second chamber 52 is delayed from the inflation timing of the first chamber 51 (delayed inflation in FIG. 6) are illustrated.

As illustrated in FIG. 6, when the first chamber 51 and the second chamber 52 are simultaneously inflated in a situation in which the vehicle M comes into contact with the pedestrian P1 in the front side portion of the vehicle M, the pedestrian P1 is likely to reach near an A-pillar APL, which is one of window pillars of the vehicle M, due to a recoil (reaction force) by gas pressure of the first chamber 51 and the second chamber 52, the slip on the second chamber 52, and the like. As a result, a head portion of the pedestrian P1 is likely to come into contact with the A-pillar APL, and a load (impact risk) at the time of contact of the pedestrian P1 is likely to increase.

Therefore, the airbag controller 140 can reduce an amount of movement of the pedestrian P1 toward the rear side of the vehicle through recoil due to gas pressure in the second chamber 52 or slip on the second chamber 52, and curb the pedestrian P1 reaching the A-pillar APL, by delaying the inflation timing of the second chamber 52. The example of FIG. 6 shows that a moving distance of the pedestrian P1 toward the rear side of the vehicle is shortened by the distance D1 as compared with a case in which the second chamber 52 is inflated and opens. Even when the inflation timing of the second chamber 52 is delayed, it is possible to reduce the load on the pedestrian P1 because the first chamber 51 is inflated and opens at the time of contact. When the inflation timing of the second chamber 52 is delayed, the pedestrian P1 comes into direct contact with the hood HD or comes into contact with the second chamber 52 having a small gas pressure, but because an impact absorbing structure or the like is included in the hood HD in order to protect an engine and the like inside the vehicle body from external impact, it is possible to reduce the load on the pedestrian P1 as compared with the A pillar. In a case in which the PUH system is included in the airbag device 50, when the vehicle M comes into contact with the pedestrian P1, the airbag controller 140 can operate the PUH system at a timing when the first chamber 51 is inflated so that the load on the pedestrian P1 can be further reduced.

[Driving Controller]

Figure 7:
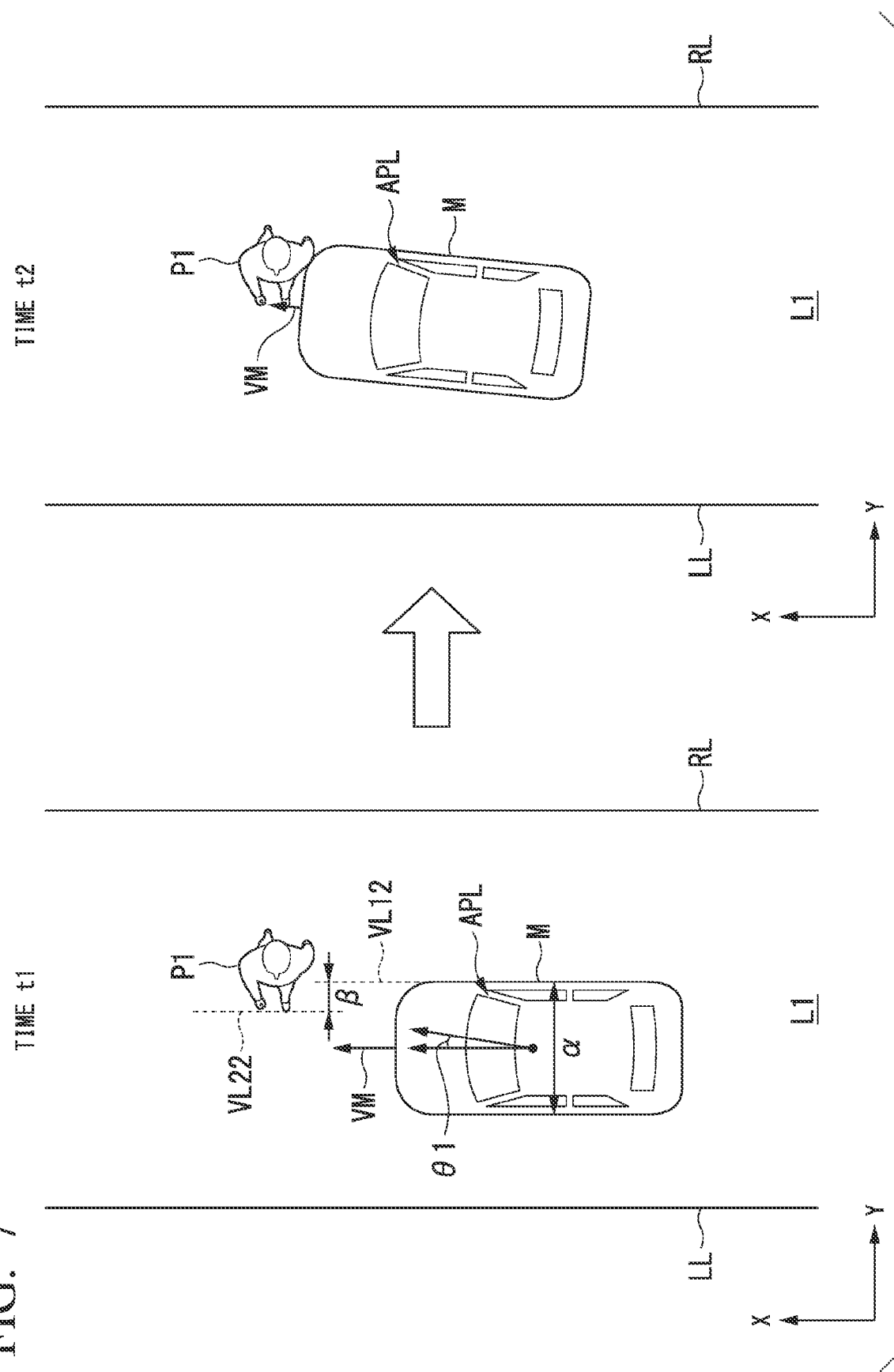
FIG. 7 is a diagram illustrating a behavior of a vehicle M under driving control of a driving controller.

Next, details of a function of the driving controller 150 will be described. For example, when the contact determiner 120 determines that the vehicle M comes into contact with the pedestrian P1, and the index value derived by the index value deriver 130 is smaller than the threshold value, the driving controller 150 controls at least the steering between the steering and acceleration or deceleration of the vehicle M. FIG. 7 is a diagram illustrating a behavior of the vehicle M under driving control of the driving controller 150. In an example of FIG. 7, a behavior of the vehicle M at time t1 and time t2 later than time t1 is shown. It is assumed that the vehicle M travels in the lane L1 at a speed VM, and the pedestrian P1 is present in the traveling direction of the vehicle M. It is assumed that the contact determiner 120 determines that the vehicle M comes into contact with the pedestrian P1 at time t1.

At time t1, the driving controller 150 controls the steering of the vehicle M so that a position in which the vehicle M comes into contact with the pedestrian P1 is closer to the center of the vehicle M. In this case, the driving controller 150 performs steering control so that the vehicle M is directed to the pedestrian P1. In the example of FIG. 7, steering control for tilting the vehicle M toward the pedestrian P1 by an angle $\theta 1$ with reference to a current traveling direction of the vehicle M (an X-axis direction in FIG. 7) at time t1 is performed. The angle $\theta 1$ may be a fixed angle or may be a variable angle that can be changed according to the lap amount, the lap rate, the speed VM of the vehicle M, a road shape, and the like. The driving controller 150 may perform speed control for decelerating the vehicle M, in addition to the steering control described above. The above-described driving control may be executed, for example, at a timing when the contact determiner 120 determines that the vehicle M comes into contact with the pedestrian P1, or may be executed a timing at which the airbag controller 140 starts the inflation of the first chamber 51.

Accordingly, when the pedestrian P1 comes into contact with the vehicle M at time t2, it is possible to causes the position of the pedestrian P1 to be closer to the center side of the vehicle M. Therefore, it is possible to more reliably curb the head portion or the like of the pedestrian P1 coming into contact with the A-pillar APL. Since the pedestrian P1 can be more reliably taken onto the hood HD, it is possible to reduce the load on the pedestrian P1 rather than the pedestrian P1 falling on the road. Further, even when the head portion of the pedestrian P1 reaches a front windshield, it is possible to reduce the load on the pedestrian P1 because the front windshield has a lower rigidity than the A-pillar APL.

[Processing Flow]

Figure 8:
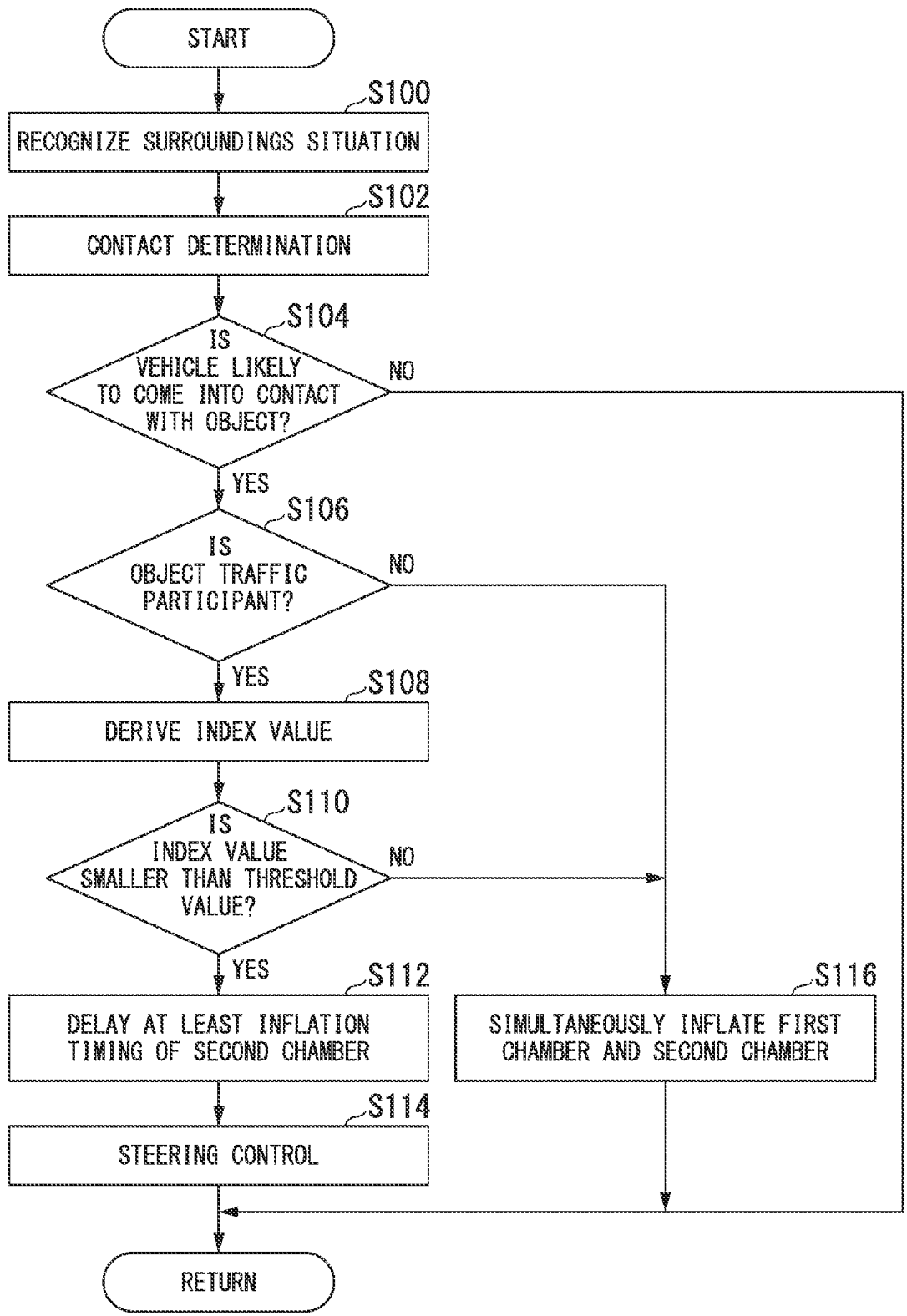
FIG. 8 is a flowchart illustrating an example of a flow of processing that is executed by a control device.

FIG. 8 is a flowchart illustrating an example of a flow of processing that is executed by the control device 100. Hereinafter, a determination as to whether or not the vehicle M comes into contact with an object, airbag control, and driving control processing among processing that are executed by the control device 100 will be mainly described. The processing of this flowchart may be repeatedly executed at a predetermined cycle.

In the example of FIG. 8, the recognizer 110 recognizes the surroundings situation of the vehicle M (step S100). Then, the contact determiner 120 determines whether or not the vehicle M comes into contact with the object near the vehicle M (step S102), and determines whether or not the vehicle M is likely to come into contact with the object (step S104). When it is determined that the vehicle M is likely to come into contact with the object, the contact determiner 120 determines whether or not the object determined to be likely to contact is a traffic participant (step S106).

When it is determined that the object determined to be likely to contact is a traffic participant, the index value deriver 130 derives an index value indicating a degree of overlap in the vehicle width direction between the vehicle M and the object (step S108). Then, the airbag controller 140 determines whether or not the index value is smaller than the threshold value (step S110). When the airbag controller 140 determines that the index value is smaller than the threshold value, the airbag controller 140 operates the airbag device 50. In this case, the airbag controller 140 delays the inflation timing of at least the second chamber 52 that is inflated and opens onto the hood HD between the first chamber 51 and the second chamber 52, as compared with a case in which the index value is equal to or larger than the threshold value (step S112). In the process of step S112, at least the inflation timing of the second chamber 52 inflated and opening onto the hood HD may be delayed from the inflation timing of the first chamber 51. Then, the driving controller 150 performs steering control so that the vehicle M is directed toward the traffic participant and comes in contact with the traffic participant on the more central side of the vehicle M (step S114).

When it is determined in the process of step S106 that the object is not a traffic participant or when it is determined in the process of step S110 that the index value is not smaller than the threshold value (equal to or greater than the threshold value), the airbag controller 140 operates the airbag device 50 so that the first chamber 51 and the second chamber 52 are simultaneously inflated (step S116). Accordingly, the processing of this flowchart ends. When it is determined in the process of step S104 that the vehicle is unlikely to come into contact with the object, the processing of the flowchart ends. In the embodiment, the process of step S114 among the processes illustrated in FIG. 8 may be omitted.

Modification Example

In the airbag device 50 of the embodiment, an indoor airbag device that inflates a bag body to cover a head or upper body of an occupant in a vehicle cabin when the vehicle M has come into contact with an object, and reduces a load on the occupant may be included, in addition to the airbag device outside a vehicle described above. The indoor airbag device is housed in, for example, a steering wheel or a vehicle seat. The airbag controller 140 operates the indoor airbag device when it is determined that the vehicle M comes into contact with the object and a TTC is smaller than a predetermined time, or when the vehicle M has come into contact with the object. The airbag device 50 of the embodiment may be configured without the first chamber 51 and the third chamber 53.

According to the embodiment described above, with the control device 100, it is possible to further reduce a load of a traffic participant who comes into contact with the vehicle M by including the airbag (for example, the second chamber 52) inflated at least onto the hood of the vehicle M by being filled with gas supplied from the gas supply (for example, the first gas supply 54), the recognizer 110 that recognizes the surroundings situation of the vehicle M, the index value deriver 130 that derives the index value indicating the degree of overlap in the vehicle width direction between the traffic participant recognized by the recognizer 110 and the vehicle M when the traffic participant comes into contact with the vehicle, and the airbag controller 140 that controls a timing at which the airbag is inflated, on the basis of the index value derived by the index value deriver 130.

Specifically, according to the embodiment, when it is determined that the traffic participant comes into contact with a front side portion of the vehicle body, it is possible to prevent the traffic participant from moving toward the rear side of the vehicle M due to the recoil (reaction force) by the gas pressure of the second chamber 52 and coming into contact with a highly rigid portion such as the A pillar, by delaying at least the inflation timing of the second chamber 52 that is inflated onto at least the hood. According to the embodiment, when it is determined that the traffic participant comes into contact near the front side portion of the vehicle body, it is possible to reduce a possibility of the traffic participant coming into contact with the A pillar by performing steering control for directing the vehicle body toward the traffic participant, and to reduce a load due to the contact of the traffic participant by taking the traffic participant with the hood HD.

The embodiment described above can be represented as follows.

A control device including a storage device that stores a program, and a hardware processor, and configured to recognize a surroundings situation of a vehicle, derive an index value indicating a degree of overlap in a vehicle width direction between a recognized traffic participant near the vehicle and the vehicle when the traffic participant comes into contact with the vehicle, and control a timing at which an airbag is inflated, on the basis of the derived index value, the airbag being inflated at least onto a hood of the vehicle by being filled with gas supplied from a gas supply, by the hardware processor executing the program stored in the storage device.

Although the modes for carrying out the present invention have been described above using the embodiments, the present invention is not limited to these embodiments and various modifications and substitutions can be made without departing from the gist of the present invention.

What is claimed is:

1. A control device comprising:
an airbag inflated at least onto a hood of a vehicle by being filled with gas supplied from a gas supply;
a recognizer configured to recognize a surroundings situation of the vehicle;
an index value deriver configured to derive an index value indicating a degree of overlap in a vehicle width direction between a traffic participant recognized by the recognizer and the vehicle when the traffic participant comes into contact with the vehicle; and
an airbag controller configured to control a timing at which the airbag is inflated on the basis of the index value derived by the index value deriver,
wherein the airbag includes a first chamber inflated to cover a front head of a vehicle body and a second chamber inflated onto the hood of the vehicle by being filled with the gas supplied from the gas supply, and
when the index value is smaller than a threshold value, the airbag controller delays a timing at which the second chamber is inflated from a timing at which the first chamber is inflated so that the traffic participant contacts the hood directly or contacts the second chamber with lower gas pressure.

2. The control device according to claim 1,
wherein, when the index value is smaller than the threshold value, the airbag controller delays the timing at which the airbag is inflated compared with a case in which the index value is equal to or larger than the threshold value.

3. The control device according to claim 1, further comprising:
a driving controller configured to control at least one of steering or acceleration/deceleration of the vehicle without depending on an operation of an occupant of the vehicle,
wherein the driving controller controls at least the steering of the vehicle when the index value is smaller than the threshold value.

4. The control device according to claim 3,
wherein the driving controller controls the steering of the vehicle so that a position in which the vehicle comes into contact with the traffic participant is closer to a center of the vehicle.

5. A control method comprising:
recognizing, by a computer of a control device, a surroundings situation of a vehicle;
deriving, by the computer, an index value indicating a degree of overlap in a vehicle width direction between a recognized traffic participant near the vehicle and the vehicle when the traffic participant comes into contact with the vehicle; and
controlling, by the computer, a timing at which an airbag is inflated on the basis of the derived index value, the airbag being inflated at least onto a hood of the vehicle by being filled with gas supplied from a gas supply,
wherein the airbag includes a first chamber inflated to cover a front head of a vehicle body and a second chamber inflated onto the hood of the vehicle by being filled with the gas supplied from the gas supply, and
delaying, by the computer, a timing at which the second chamber is inflated from a timing at which the first chamber is inflated so that the traffic participant contacts the hood directly or contacts the second chamber with lower gas pressure, when the index value is smaller than a threshold value.

6. A control method comprising:
recognizing, by a computer of a control device, a surroundings situation of a vehicle;
deriving, by the computer, an index value indicating a degree of overlap in a vehicle width direction between a recognized traffic participant near the vehicle and the vehicle when the traffic participant comes into contact with the vehicle;
controlling, by the computer, a timing at which an airbag is inflated on the basis of the derived index value, the airbag being inflated at least onto a hood of the vehicle by being filled with gas supplied from a gas supply;
controlling, by the computer, at least one of steering or acceleration/deceleration of the vehicle without depending on an operation of an occupant of the vehicle; and
controlling, by the computer, at least the steering of the vehicle so that a position in which the vehicle comes into contact with the traffic participant is closer to a center of the vehicle before the vehicle and the traffic participant come into contact, when the index value is smaller than the threshold value.

7. The control method according to claim 6,
delaying, by the computer, the timing at which the airbag is inflated compared with a case in which the index value is equal to or larger than the threshold value, when the index value is smaller than the threshold value.

8. The control method according to claim 6,
wherein the airbag includes a first chamber inflated to cover a front head of a vehicle body and a second chamber inflated onto a hood of the vehicle by being filled with the gas supplied from the gas supply, and
delaying, by the computer, a timing at which the second chamber is inflated from a timing at which the first chamber is inflated, when the index value is smaller than the threshold value.

* * * * *